Figure 1:
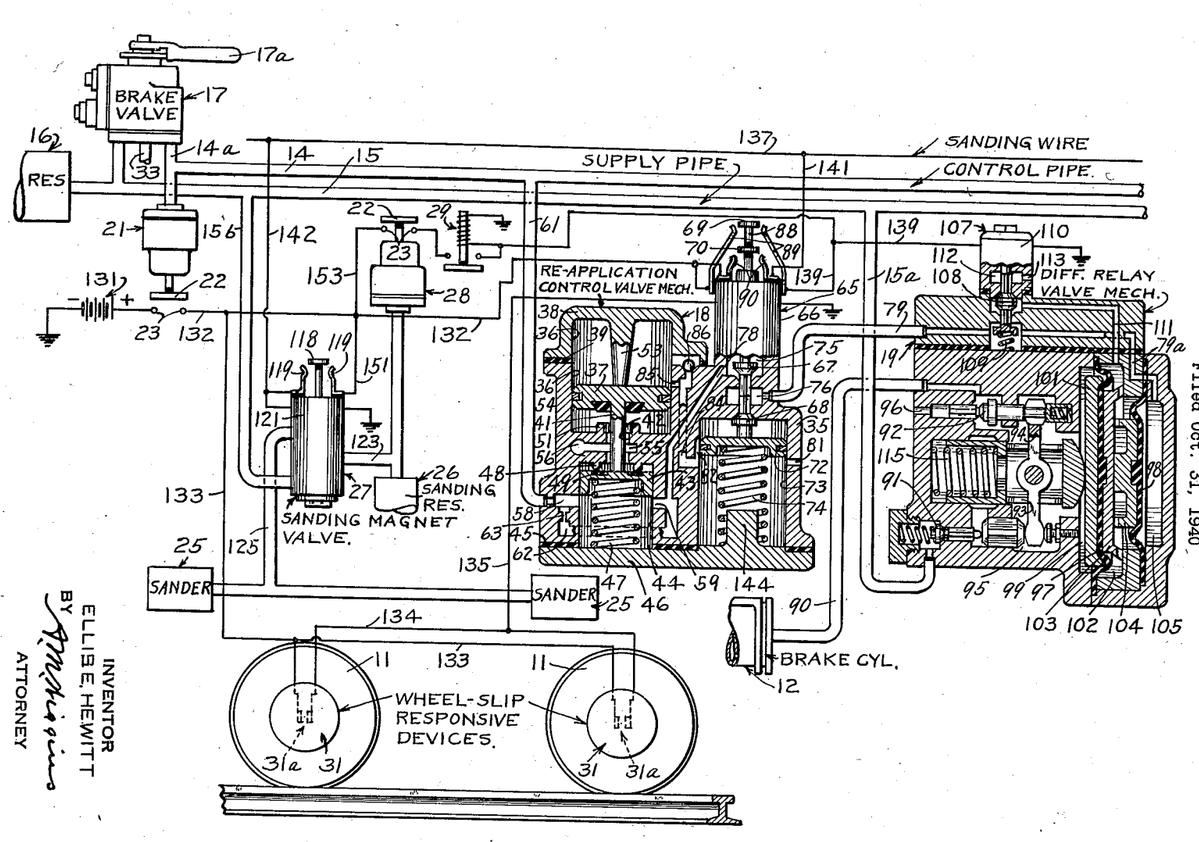

April 14, 1942.  E. E. HEWITT  2,279,398
BRAKE CONTROL APPARATUS
Filed Oct. 31, 1940

INVENTOR
ELLIS E. HEWITT
BY A. M. Higgins
ATTORNEY

_Patented Apr. 14, 1942_                                              2,279,398

UNITED STATES PATENT OFFICE 2,279,398

BRAKE CONTROL APPARATUS

Ellis E. Hewitt, Edgewood, Pa., assignor to The Westinghouse Air Brake Company, Wilmerding, Pa., a corporation of Pennsylvania Application October 31, 1940, Serial No. 363,591

9 Claims. (Cl. 303—21)

This invention relates to brake control apparatus for preventing sliding of vehicle wheels and has particular relation to brake control apparatus including means automatically responsive to the slipping of vehicle wheels for initiating a rapid release of the brakes associated with the wheels to prevent the sliding thereof.

As is well known, if the braking force applied to a vehicle wheel is such as to exceed the limit of adhesion or rolling friction between the wheel and the road surface or rail on which the wheel rolls, the wheel decelerates rapidly to a locked condition and slides.

If the braking force is rapidly reduced while the wheel is slipping, that is rotating at a speed less than a speed corresponding to vehicle speed at a given instant during its deceleration to a locked condition, the wheel will cease to decelerate and begin to accelerate back toward a speed corresponding to vehicle or rail speed without decelerating to the locked condition and sliding.

It should be understood that the terms "slide" and "slip" or "sliding condition" and "slipping condition" as applied to a vehicle wheel herein are not synonymous, a sliding wheel being one that is dragged along the rail in a locked or non-rotative condition while a slipping wheel is one which is rotating at a speed less than a speed corresponding to vehicle speed at a given instant.

In Patent No. 2,140,620 of Clyde C. Farmer, a vehicle wheel brake control apparatus is disclosed including a rotary inertia device responsive to the rotative deceleration of a vehicle wheel at a slipping rate for initiating a rapid release of the brakes associated with the slipping wheel so as to prevent the sliding thereof. At the same time, the apparatus is automatically conditioned in response to the initiation of slipping of the wheel to limit the degree of reapplication of the brakes on the slipping wheel to a lesser degree than that which initiated the slipping so as to prevent possible recurrence of slipping. Reapplication of the brakes on a wheel which slipped is effected automatically as the wheel accelerates back toward vehicle speed.

It is an object of my present invention to provide a brake control apparatus of the type disclosed in the above mentioned Patent 2,140,620 and characterized by a novel arrangement whereby the degree of reapplication of the brakes on a wheel which slipped is not limited to a lesser value than that which initiated the slipping of the wheel unless a predetermined time elapses following the instant the wheel first begins to slip during any one application.

It is a further object of my invention to provide brake control apparatus of the character indicated in the foregoing object wherein a rapid reduction of the degree of application of the brakes associated with a given wheel is initiated at the time the wheel begins to slip effective also, at the same time, to cause sanding of the rails in advance of the slipping wheel and other wheels of the vehicle.

It is a further object of my invention to provide a brake control apparatus of the character indicated in the foregoing objects and further characterized by timing means utilizing the time required for the pressure in a sanding reservoir to reduce to below a certain pressure for determining the degree of reapplication of the brakes on the slipping wheel with respect to the degree of application in effect at the time the wheel first began to slip.

The above objects and other objects of my invention which will be made apparent hereinafter, are attained by means of an illustrative embodiment of my invention shown in the single figure of the accompanying drawing.

Description of equipment

Referring to the single figure of the drawing, the apparatus is shown in connection with a single four-wheel truck, only one wheel 11 for each axle or wheel unit of the truck being shown.

For simplicity, the brake shoes associated with the wheels 11 are not shown. They may be of the conventional clasp type engaging the rim of the wheel and applied and released through conventional brake rigging in response to the supply of fluid under pressure to and the release of fluid under pressure from a brake cylinder 12.

The apparatus whereby the operator of the car or train controls the supply of fluid under pressure to and the release of fluid under pressure from the brake cylinder 12 may be any desired type, either of the so-called automatic or straight-air type. I have shown a simplified form of straight-air brake control apparatus including two train pipes 14 and 15 hereinafter respectively designated the control pipe and the supply pipe, a reservoir 16 to which the supply pipe 15 is constantly connected, and a manually operated self-lapping brake valve 17. The fluid pressure brake control apparatus further includes, according to my invention, a so-called reapplication control valve mechanism 18 and a differential relay valve mechanism 19, both of which will be presently described in detail.

Connected to the control pipe 14 by a branch pipe 14a and operatively responsive to variations of fluid pressure in the control pipe 14, is a so-called pressure switch 21. Pressure switch 21 may be of any well-known type, preferably snap-acting, adapted to cause its movable contact member 22 to be snapped into its closed position engaging a pair of insulated fixed contacts 23 in response to the increase of pressure in the control pipe 14 above a certain low pressure such as five pounds per square inch. Conversely, when the pressure in the control pipe 14 reduces below five pounds per square inch, the contact 22 of the pressure switch 21 is snapped to its open position out of engagement with the fixed contacts 23.

The sanding apparatus comprises a pair of sanding devices 25 of the usual type adapted to cause the deposition of sand in advance of the vehicle wheels upon the supply of fluid under pressure thereto and to cease depositing sand upon the cessation of the supply of fluid under pressure thereto, a sanding reservoir 26, and a sanding magnet valve and switch device 27, hereinafter simply referred to as the sanding magnet valve.

Associated with the sanding reservoir 26 is a pressure switch 28, similar to the pressure switch 21, that is operatively controlled by variations of the pressure in the sanding reservoir 26. Pressure switch 28 differs from the pressure switch 21 in that the movable contact 22 thereof is snapped into its closed position engaging the fixed contacts 23 when the pressure in the reservoir 26 reduces below a pressure such as five pounds per square inch, and snapped to its open position disengaging the contacts 23 whenever the pressure in the reservoir 26 exceeds five pounds per square inch.

Associated with the pressure switch 28 is a conventional relay 29 having a single contact 40 which is shifted to its picked-up or closed position in response to energization of the magnet winding thereof and restored to its dropped-out or open position when the magnet winding is deenergized.

In addition, the apparatus includes a wheel-slip-responsive device 31 of the rotary inertia type which may be associated with each of the wheel units as by mounting at the end of the usual axle journal in the manner disclosed and claimed in Patent 2,198,033 of Clyde C. Farmer. The wheel-slip-responsive devices 31 are not in themselves my invention and thus a complete description thereof is deemed unnecessary herein since reference may be had to the above-mentioned Farmer patent for details of construction and mounting thereof. It is sufficient to say for purposes of the present invention that the wheel-slip-responsive devices 31 include a switch device 31a which is operated to closed position whenever and as long as the rate of rotative deceleration or acceleration of the vehicle wheels with which it is associated exceeds a certain rate such as ten miles per hour per second. In view of the fact that a rate of ten miles per hour per second deceleration and acceleration is not attained by the vehicle wheels unless they are slipping, it will be understood that the switch devices 31a of the wheel-slip-responsive devices 31 are not operated to closed position during the normal rate of deceleration and acceleration of the vehicle wheels.

The wheel-slip-responsive devices 31 are effective, in a manner subsequently to be described, to control the operation of the reapplication control valve mechanism 18 and the differential relay valve mechanism 19.

Considering the parts of the equipment in greater detail, the self-lapping brake valve 17 is of the type described and claimed in Patent 2,042,112 of Ewing K. Lynn and Rankin J. Bush and accordingly only a functional description thereof is given herein. The brake valve 17 has an operating handle 17a which is shiftable in a horizontal plane from a normal brake release position into an application zone. Brake valve handle 17a operates a rotary operating shaft which controls the operation of suitable supply and release valves in the brake valve. With the operating handles 17a in its brake release position, fluid under pressure in the control pipe 14 is exhausted to atmosphere through an exhaust port and pipe 33 at the brake valve. When the brake valve handle 17a is shifted into its application zone, fluid under pressure is supplied from the reservoir 16 to the control pipe 14. The construction of the brake valve 17 is such that when the pressure in the control pipe reaches a value corresponding to the displacement of the brake valve handle out of its brake release position, the supply to the pipe 14 is automatically lapped or cut-off. Thus the pressure established by the brake valve in the control pipe 14 is substantially proportionate to the degree of displacement of the brake valve handle 17a out of its brake release position.

If the pressure in the control pipe 14 tends to reduce due to leakage or other causes, the brake valve 17 operates automatically to supply fluid under pressure thereto to maintain a pressure therein corresponding to the position of the brake valve handle 17a. This pressure-maintaining feature of the brake valve 17 will be referred to hereinafter in connection with the reapplication of the brakes on a slipping wheel.

The reapplication control valve mechanism 18 comprises a suitable casing 35 having formed therein a bore 36 in which a piston 37 operates. A cover 38 having a bore 36 conforming to the bore 36 in the casing 35 and providing an extension thereof is secured to the casing 35 in sealed relation as by a gasket 39 and suitable screws or bolts, not shown.

The piston 37 is provided with a stem 41 that extends downwardly through a passage 42 into engagement with the upper surface of a piston valve 43 that operates in another bore 44 formed in the casing 35.

Secured to the casing 35 as by a suitable gasket 45 and suitable screws or bolts, not shown, is a cover plate 46 which closes the open end of the bore 44. Interposed between the cover 46 and the lower face of the piston valve 43 is a coil spring 47 which urges the piston valve upwardly into seated relation on an annular rib seat 48 surrounding the opening of the passage 42 at the base of the bore 44. A suitable annular gasket 49 is provided in the upper face of the piston valve 43 for engaging the rib seat 48 in sealing relation.

The stem 41 of the piston 37 is of such length that when the piston valve 43 is seated on the rib seat 48, the piston 37 is raised to an unseated position with respect to an annular rib seat 51 surrounding the upper opening of the passage 42 at the base of the bore 36. A projecting lug or finger 53 formed on the inner surface of the cover 38 extends downwardly into the bore 36 and limits the upward movement of the piston 37. An annular gasket 54 is provided in the lower face of the piston 37 surrounding the stem 41 for engaging the annular rib seat 51 in sealing relation upon downward movement of the piston 37.

Formed in the wall between the two bores 36 and 44 is a chamber 55 into which the passage 42 opens. Chamber 55 is constantly open to atmosphere through an exhaust passage and port 56.

With the piston valve 43 in its raised position seated on the annular rib seat 48, the piston valve is above two ports 58 and 59 opening into the bore 44 at substantially the same distance from the cover plate 46. Port 58 is connected through a pipe 61 to the control pipe 14.

Connecting the ports 58 and 59 in by-passing relation to the bore 44 is a passage 62 formed in casing 35 and containing a restricted portion or choke 63.

With the piston valve 43 in its raised position, fluid under pressure may be accordingly supplied at a rapid rate from the supply pipe 14 through the branch pipe 61 and port 58 into the bore 44 and out of the bore through port 59.

Upon the supply of fluid under pressure to the chamber above the piston 37 in a manner presently to be described, piston 37 is shifted downwardly into seated relation on the annular rib seat 51, in which position the piston valve 43 laps or covers the ports 58 and 59, thus preventing the supply of fluid under pressure from the control pipe 14 to the port 59 except at a restricted rate through the by-pass communication 62.

The reapplication control valve mechanism 18 further comprises a magnet valve and switch device 65, which includes a suitable solenoid or magnet winding 66. The magnet winding 66 is adapted to operate a pair of oppositely seating valves 67 and 68 of the poppet type and a pair of insulated contact members 69 and 70 respectively.

The poppet valve 68 is attached to or formed integrally with a piston 72 that operates in a bore 73 in the casing 35. Interposed between the cover plate 46, which covers the open end of the bore 73, and the lower face of the piston 72 is a coil spring 74 which urges the piston 72 upwardly to maintain the valve 68 seated on its associated valve seat when the magnet winding 66 is deenergized. The fluted stems of the valves 67 and 68 are of such length that when the valve 68 is seated, the valve 67 is unseated upwardly from its associated valve seat to establish communication between a chamber 75 in which it is contained and a chamber 76 located between the chamber 75 and the bore 73. Port 59 is constantly connected through a passage 78 with the chamber 75 and a pipe 79 connected to the chamber 76 leads to the differential relay valve mechanism 19. Accordingly, when the magnet winding 66 is deenergized and the valves 67 and 68 are in unseated and seated positions respectively as shown, fluid under pressure may be supplied from the control pipe 14 through the branch pipe 61, port 58, bore 44, port 59, passage 78, chambers 75 and 76, and through the pipe 79 to the differential relay valve mechanism 19.

With the valve 68 seated, the piston 72 is above an exhaust port 81 in the wall of the casing 35 so that the chamber formed in the bore 73 below the piston 72 is thus vented to atmosphere. At the same time, a feed groove 82 around the piston establishes communication between the chamber at the upper side of the piston 72 and the chamber at the lower side of the piston.

In the raised position of the piston 72, it is also above the opening of a passage 84 into the bore 73, the opposite end of which passage opens into the chamber formed above the piston 37. The opening of the passage 84 into the chamber above the piston 37 comprises a restricted port 85 and a relatively unrestricted passage in parallel relation therewith, the latter passage including a one-way valve of the ball type 86 which is arranged to permit the supply of fluid under pressure through the passage 84 into the chamber above the piston 37 and to prevent reverse flow of fluid under pressure therepast.

The switch contacts 69 and 70 of the magnet valve and switch device 65 are carried on a stem 88 moved by and in correspondence with the movement of the plunger actuated in response to energization and deenergization of the magnet winding 66. Associated with the contact 69 are a pair of spaced insulated contact fingers 89 and associated with the contact 70 are a pair of spaced insulated contact fingers 90. When the magnet winding 66 is deenergized, the stem 88 is raised to a position such that the contacts 69 and 70 are shifted out of engagement with the associated pairs of contact fingers.

When the magnet winding 66 is energized, the stem 88 is shifted downwardly and the contacts 69 and 70 correspondingly moved into bridging engagement with the associated pairs of contact fingers. At the same time, the valves 67 and 68 are shifted downwardly to seated and unseated positions respectively.

The manner in which the reapplication control valve mechanism 18 functions will be hereinafter described in detail in connection with an assumed operation.

The differential relay valve mechanism 19 is of the type described in detail in Patent 2,191,822 of Clyde C. Farmer and will here be but briefly described since reference may be had to this patent for a detailed description.

Briefly, the differential relay valve mechanism 19 comprises a self-lapping relay valve mechanism including a supply valve 91, a release valve 92, and an operating plunger 93 having pivoted thereon a floating lever 94 for operating the valves 91 and 92.

Supply valve 91 controls communication between a branch pipe 15a of the supply pipe 15 and a chamber 95 in the relay valve mechanism hereinafter called the pressure chamber, to which the brake cylinder 12 is constantly connected as by a pipe 90. The release valve 92 controls communication between the pressure chamber 95 and atmosphere through an exhaust port 96.

The relay valve mechanism further comprises a pair of imperforate unconnected flexible diaphragms, of different effective pressure areas, hereinafter respectively referred to as the larger diaphragm 97 and the smaller diaphragm 98. As will be explained hereinafter, the diaphragms 97 and 98 may be selected so as to have any desired ratio between the effective pressure areas thereof.

The diaphragms 97 and 98 are secured in peripherally clamped relation in the casing of the relay valve mechanism in coaxial spaced relation to each other at one end of the plunger 93.

The larger diaphragm 97 has formed on the left-hand side thereof a chamber 99 into which the pressure chamber 95 opens. A follower 101 suitably guided in the casing and preferably attached to the flexible diaphragm 97 engages the rounded end of the plunger 93 which projects out of the pressure chamber 95 into chamber 99.

Formed between the two diaphragms 97 and 98 is a chamber 102. Suitably adhering to the faces of the diaphragms 97 and 98 within the chamber 102 are followers 103 and 104 respectively which serve to maintain a minimum spacing between the diaphragms.

Formed at the outer face, that is the right-hand face, of the smaller diaphragm 98 is a chamber 105 with which the pipe 79 leading from the reapplication control valve mechanism 18 is in constant communication through a passage 79a.

The differential relay valve mechanism further comprises a magnet valve 107 for alternatively connecting the chamber 102 between the diaphragms 97 and 98 to the passage 79a or to atmosphere.

Magnet valve 107 comprises a double beat valve 108 which is urged to an upper seated position by a coil spring 109 and actuated to a lower seated position in response to energization of a magnet winding 110. In its upper seated position, the valve 108 establishes communication from the passage 79a to a passage 111 leading to and opening into the chamber 102 between the diaphragms 97 and 98.

In its lower seated position, the communication between the passage 79a and the chamber 102 is closed and communication established from the passage 111 to a chamber 112 which is constantly open to atmosphere through a large port 113.

When the magnet valve 107 is deenergized and fluid under pressure is supplied through the pipe 79 to the chambers 102 and 105, the fluid pressure forces on the smaller diaphragm 98 are balanced and only the unbalanced fluid pressure force on the diaphragm 97 is effective to shift the plunger 93 in the left-hand direction to effect seating of the release valve 92 and unseating of the supply valve 91 in succession. Fluid under pressure is accordingly supplied from the supply pipe 15 to the pressure chamber 95 and thence to the brake cylinder 12 through pipe 99.

When the fluid pressure force in the pressure chamber 95 acting on the left face of the larger diaphragm 97 becomes substantially equal to the fluid pressure force in the chamber 102, a spring 115 restores the plunger 93 in the right-hand direction sufficiently to reseat the supply valve 91 but not to unseat the release valve 92. Fluid under pressure is accordingly maintained in the brake cylinder 12 at a pressure corresponding to the pressure established in the chamber 102.

With the magnet winding 110 of the magnet valve 107 energized and the valve 108 correspondingly shifted to its lower seated position, fluid under pressure is exhausted from the chamber 102 between the two diaphragms 97 and 98 through port 113 and consequently the fluid under pressure supplied through the pipe 79 charges only the chamber 105 at the outer face of the smaller diaphragm 98. In such case, therefore, only the unbalanced force of fluid pressure acting on the smaller diaphragm 98 is effective to shift the plunger 93 in the left-hand direction to effect successive seating and unseating of the release and supply valves 92 and 91. Due to the larger area of the diaphragm 97 in comparison with the area of the diaphragm 98, the fluid pressure established in the pressure chamber 95 is effective at a lower value than previously to effect the reseating of the supply valve 91.

Assuming that the larger diaphragm 97 has an effective pressure area of ten square units and the smaller diaphragm 98 has an effective pressure area of eight square units, it will be seen that the pressure established in the pressure chamber 95 will bear the same ratio to the pressure established in the chamber 105 as the area of the smaller diaphragm bears to the area of the larger diaphragm 97. Thus, the pressure established in the pressure chamber 95 will be eighty per cent of that established in the chamber 105.

The sanding magnet valve 27 has a double beat valve similar to the magnet valve 107 on the differential relay valve mechanism and differs therefrom in having a movable switch contact 118 which is shifted into contact with a pair of insulated fixed contacts 119 in response to energization of the magnet winding 121 thereof and restored to a position out of engagement with the contacts 119, as shown, in response to deenergization of the magnet winding 121.

With the magnet winding 121 of the sanding magnet valve deenergized as shown, communication is established past the double beat valve thereof from a branch pipe 15b of the supply pipe to a pipe 123 having two branches, one of which leads to the sanding reservoir 26 and the other of which leads to the pressure switch 28. Accordingly, when the magnet winding 121 of the sanding magnet valve 27 is deenergized, the sanding reservoir 26 is charged to the pressure in the supply pipe 15 and the pressure switch 28 is actuated to its open position.

When the magnet winding 121 of the sanding magnet valve 27 is energized, the double beat valve thereof is shifted to cut-off the charging communication for the sanding reservoir 26 and establish a communication through which fluid under pressure is supplied from the sanding reservoir 26 to a pipe 125 having two branches, one of which leads to the sander 25 for one wheel unit and the other of which leads to the sander 25 for the other wheel unit.

Accordingly, as long as the magnet winding 121 of the sanding magnet valve 27 is energized, fluid under pressure continues to be supplied from the sanding reservoir 26 to the sanders 25 to cause sanding of the rails until, of course, the supply of fluid in the sanding reservoir is exhausted.

The capacity or volume of the sanding reservoir 26 is so designed that the pressure therein reduces below five pounds per square inch in a predetermined time, such as thirty seconds. Thus, notwithstanding the fact that the magnet winding 121 of the sanding magnet valve 27 remains energized, sanding of the rails continues only for a predetermined time.

Switch contacts 118 and 119 of the sanding magnet valve 27 are effective, once the magnet winding 121 is energized to establish a self-holding circuit for maintaining the magnet winding 121 thereafter energized as long as the pressure switch 21 remains in closed position. This operation will be hereinafter described in greater detail in connection with an assumed operation.

Operation of equipment

Let it be assumed that the car or train having the equipment shown in the drawing is traveling along the road under power or coasting with the brakes released, that is, with the brake valve handle 17a in its brake release position as shown.

Let it also be assumed that the reservoir 16 is charged to the normal pressure, such as one hundred pounds per square inch, from a fluid compressor not shown, and that the supply pipe 15 and sanding reservoir 26 are correspondingly charged with fluid under pressure. The pressure switch 21 is in its open position because the pressure in the control pipe 14 is at atmospheric pressure and the pressure switch 28 is in open position because of the fact that the sanding reservoir 26 is fully charged.

The reapplication control valve mechanism 18 and the differential relay valve mechanism 19 are conditioned as shown in the drawing for reasons which will be made apparent hereinafter and the brake cylinder 12 is connected to atmosphere past the unseated release valve 92 of the differential relay valve mechanism.

Let it now be further assumed that the operator desires to effect an application of the brakes in order to bring the car or train to a stop. To do so, he first shuts off the propulsion power, if the power is on and then shifts the brake valve handle 17a into its application zone an amount corresponding to the desired degree of application of the brakes. The control pipe 14 is thus charged to a corresponding pressure such as forty pounds per square inch. Pressure switch 21 is thus snapped to its closed position whenever the pressure in the control pipe 14 increases above five pounds per square inch. At the same time fluid under pressure is supplied from the supply pipe 14 through the branch pipe 61 and at a rapid rate through the port 68, bore 44, port 59, passage 78, past the unseated valve 67, chamber 76, pipe 79 and passage 79a to the chamber 105 at the outer face of the smaller diaphragm 98 of the relay valve mechanism 19. At the same time, due to the fact that the magnet winding 110 of the magnet valve device 107 is deenergized for reasons hereinafter made apparent, fluid under pressure is also supplied from the passage 79a to the passage 111 and thus to the chamber 102 between the diaphragms 97 and 98.

The relay valve mechanism 19 is accordingly operated to supply fluid under pressure from the supply pipe 15 to the pressure chamber 95 and connected brake cylinder 12. The pressure established in the brake cylinder 12 will be substantially equal to the pressure established in the control pipe 14 due to the fact that the larger diaphragm 97 is effective to operate the relay valve mechanism 19. Thus, assuming forty pounds per square inch pressure to be established in the control pipe, fluid at a pressure of substantially forty pounds per square inch will be established in the brake cylinder 12 to effect application of the brakes on the wheels 11 at the corresponding degree.

As long as the wheels 11 do not slip due to the application of the brakes, the degree of application of the brakes remains as determined by the pressure established in the brake cylinder 12, affected only by variation of the coefficient of friction between the brake shoes and the wheels in well known manner.

As the car or train reduces in speed, the operator may in customary manner effect a reduction in the degree of application of the brakes in order to prevent the sliding of the wheels as the car approaches a stop. Thus, if the operator shifts the brake valve handle 17a back toward brake release position, the pressure in the control pipe 14 is correspondingly reduced. The pressure in the chambers 102 and 105 of the relay valve mechanism 19 is thus likewise reduced by the back-flow of fluid under pressure therefrom to the control pipe 14 through the charging communication previously described. Due to the reduction of the pressure in the chamber 102, the higher force of the pressure in the pressure chamber 95 overcomes the fluid pressure force in the chamber 102 and the spring 115 is accordingly effective to shift the plunger 93 in the right-hand direction to effect the unseating of the release valve 92. The pressure in the pressure chamber 95 and in the brake cylinder 12 is accordingly reduced by the exhaust through the port 96 until such time as the pressure in the brake cylinder and chamber 95 reduces substantially to the pressure in the chamber 102, at which time the fluid pressure in the chamber 102 again becomes effective to shift the plunger 93 sufficiently in the left-hand direction to reseat the release valve 92 and cut-off the further exhaust of fluid under pressure from the brake cylinder and chamber 95. Thus, the pressure in the brake cylinder 12 is correspondingly reduced as the pressure in the control pipe 14 is reduced.

When the car comes to a stop and the operator desires to effect the release of the brakes before again starting the car or train, he merely restores the brake valve handle 17a to its brake release position, thus reducing the pressure in the control pipe 14 to atmospheric pressure and correspondingly reducing the pressure in the brake cylinder 12 to atmospheric pressure.

Let it now be assumed that during an application of the brakes, either one or both of the wheel units 11 begins to slip. In such case, one or both of the wheel-slip-responsive devices 31 are effective to establish a circuit for energizing the magnet winding 66 of the magnet valve 65 of the reapplication control valve mechanism 18.

This circuit extends from the positive terminal of a suitable source of direct-current, such as the storage battery 131, by way of a wire 132 including the switch contacts 22 and 23 of the pressure switch 21, a branch wire 133, one or both of the switch devices 31a of the wheel-slip-responsive devices 31 which are in parallel relation, to a wire 134, thence through a branch wire 135 including the magnet winding 66 of the magnet valve 65 to the opposite or negative terminal of the battery 131 as through a ground connection in the manner shown.

Upon the energization of the magnet winding 66 of the magnet valve 65, the movable contacts 69 and 70 are shifted into engagement with their respective pairs of contact fingers.

The contact 69 is effective when engaging its associated contact fingers 89 to establish a circuit for energizing the magnet winding 110 of the magnet valve 107 of the differential relay valve mechanism 19 and the magnet winding of the relay 29. At the same time, the contact 70 is effective while engaging its associated contact fingers 90 to establish a circuit for energizing a sanding train wire 137 which extends throughout all cars of the train. Energization of the sanding wire 137 is effective to cause energization of the magnet winding 121 of the sanding magnet valve 27 for the respective wheel trucks on all cars of the train in manner hereafter described.

The circuit for energizing the magnet winding 110 of the magnet valve 107 and magnet winding of the relay 29 extends from the positive terminal of the battery 131 by way of the wire 132 including the closed pressure switch 21, contact fingers 89 and contact 69 of the magnet valve 65, a wire 139, and thence in parallel through the magnet winding 110 of the magnet valve 107 and the magnet winding 110 of the magnet valve 107 and the magnet winding of the relay 29 to the negative terminal of the battery 131, as through ground connections in the manner shown. The contact of the relay 29 is accordingly actuated to its picked-up or closed position but, due to the fact that the pressure switch 28 is in open position at this time, no immediate effect results from its operation.

The energization of the magnet winding 110 of the magnet valve 107 is effective to cause an immediate and rapid reduction of the pressure in the chamber 102 due to the exhaust of fluid under pressure therefrom through the exhaust port 113 of the magnet valve 107.

Thus, the instant that either of the wheel units 11 begins to slip, the pressure in the brake cylinder 12 is instantly reduced at a rapid rate.

The circuit for energizing the magnet winding 121 of the sanding magnet valve 27 extends from the positive terminal of the battery 131 by way of the wire 132 including the closed pressure switch 21, contact fingers 90 and contact 70 of the magnet valve 65, a wire 141, to the sanding wire 137 and thence in parallel through the magnet winding 121 of each sanding magnet valve on the car or train to the opposite terminal of the battery 131. In the drawing, the circuit extends from the sanding wire 137 by way of a branch wire 142 including magnet winding 121 to the opposite terminal of the battery 31, as through a ground connection shown.

Fluid under pressure is accordingly supplied from the sanding reservoir 26 to the sanders 25 to effect sanding of the rails in advance of the wheels throughout the train.

Upon the energization of the magnet winding 66 of the magnet valve 65 as previously described, the valves 67 and 68 are shifted to seated and unseated positions respectively. Thus, the communication through which fluid under pressure is supplied to the chambers 102 and 105 of the differential relay valve mechanism 19 is closed by the seating of the valve 67 and a communication is established by valve 68 through which the pressure in the chamber 105 is supplied back through the passage 79a and pipe 79 to the chamber above the piston 72. The feed groove 82 is sufficiently small that the pressure supplied to the chamber above the piston 72 overcomes the spring 74 and shifts the piston 72 downwardly past the exhaust port 81 into engagement with a stop lug 144 formed on the cover plate 46. Fluid under pressure is thus exhausted from the chamber 105 at a restricted rate through the port 81 and due to the restriction of the port 81, a considerable quantity of the fluid discharged from the chamber 105 is supplied through the passage 84 past the one-way valve 86 at a rapid rate to charge the chamber above the piston 37. Piston 37 is thus instantly shifted downwardly into seated position on the annular rib seat 51, thus correspondingly shifting the piston valve 43 into a position closing the opening of the ports 58 and 59 into bore 44.

Upon the equalization of the pressure in the chamber 105 of the relay valve mechanism 19 and in the chamber above the piston 37, the continued maintenance of the piston 72 in engagement with the stop lug 144 results in the reduction of the pressure simultaneously in the chamber 105 and in the chamber above the piston 37. The pressure in the chamber 105 will however reduce at a relatively rapid rate through the port 81 whereas the pressure in the chamber above the piston 37 will reduce at a relatively slow rate through the restricted port 85 and passage 84 since the ball valve 86 reseats to prevent the return of fluid under pressure therepast. Accordingly, until such time as the pressure in the chamber above the piston 37 reduces to a value such that the spring 47 can restore the piston 37 upwardly, the piston valve 43 remains in position blocking the ports 58 and 59.

The size of the port 85 relative to the volume of the chamber above the piston 37 is such as to cause the piston to be maintained seated on the rib seat 51 for a predetermined time sufficiently long for the car or train to come to a stop in a response to the application of the brakes.

It will thus be seen that due to the reduction of the pressure in the chamber 102 in response to the energization of the magnet winding 110 of the magnet valve 17 and also to the reduction of the pressure in the chamber 105 in response to the energization of the magnet winding 66 of the magnet valve 65, the pressure in the brake cylinder 12 is reduced at a rapid rate to a low degree so that the slipping wheels cease to decelerate and begin to accelerate back toward a speed corresponding to vehicle speed without actually sliding.

When the wheels cease to accelerate back to a speed corresponding to vehicle speed, while slipping, at a rate exceeding ten miles per hour per second and sufficient to maintain the switches 31a of the wheel-slip-responsive devices in closed position, the switches 31a open and thus interrupt the circuit for energizing the magnet winding 66 of the magnet valve 65. If the pressure above the piston 72 has already reduced sufficiently at such time, the spring 74 acts to shift the valves 67 and 68 upwardly again to unseated and seated positions. If, however, a sufficient pressure remains in the chamber above the piston 72 to maintain the piston 72 downwardly, then the valves 67 and 68 are not restored to their unseated and seated positions until the piston 72 is restored upwardly by the spring 74.

When the piston 72 passes above the exhaust port 81, dash-pot action of the piston 72 in the bore 73 is prevented due to the feed groove 82 equalizing the pressure on opposite sides of the piston. Thus, seating of the valve 68 by the piston 72 is not prevented or delayed.

With piston 72 in its raised position seating valve 68, fluid under pressure continues to be exhausted at a restricted rate from the chamber above the piston 37 through the passage 84 and the port 81.

Upon the deenergization of the magnet winding 66 of the magnet valve 65, the contacts 69 and 70 are shifted upwardly out of engagement with their respective associated pairs of contact fingers 89 and 90.

In view of the fact that the slipping wheels will be restored to a speed corresponding to vehicle speed in a time not exceeding several seconds, the pressure switch 28 associated with the sanding reservoir 26 is still in open position. Consequently the separation of the contact 69 from the contact fingers 89 effects deenergization of the magnet winding 110 of the magnet valve 107 and of the magnet winding of the relay 29 which correspondingly drops out.

The separation of the contact 70 from its associated contact fingers 90 interrupts the circuit for energizing the sanding wire 137. However, the magnet winding 121 of the sanding magnet valve 27 remains energized due to the self-holding circuit established therefor by the engagement of the contacts 118 and 119 thereof when the magnet winding 121 was first energized. This holding circuit extends from the positive terminal of the battery 131 on the corresponding car through the wire 132 including the closed pressure switch 121, a branch wire 151 including the contact fingers 119 and movable contact 118 of the sanding magnet valve 27, and wire 142 including the magnet winding 121 to the negative terminal of the battery 131 through the ground connection shown.

It will thus be apparent that once the magnet winding 121 of each sanding magnet valve 27 is energized in response to the initial slipping of the wheels on any car of the train, sanding of the rails is continued thereafter on all cars independently of the restoration of the slipping wheels to a speed corresponding to vehicle speed.

With the valve 67 of the magnet valve 65 restored to its unseated position and the magnet winding 110 of the magnet valve 107 of the differential relay valve mechanism 19 deenergized, fluid under pressure is again resupplied to the chambers 102 and 105 of the relay valve mechanism 19 from the control pipe 14. In this case, however, due to the fact that the piston valve 43 blocks the ports 58 and 59, fluid under pressure is supplied from the branch pipe 61 of the control pipe 14 only through the by-pass communication 62 including the choke 63. Thus, the pressure of the fluid is restored in the chambers 102 and 105 at a relatively slow or restricted rate in comparison to the normal rate.

It will accordingly be seen that the relay valve mechanism 19 operates to restore the pressure in the brake cylinder 12 and thus reapply the brakes on the slipping wheels at a gradual or slow rate, thus minimizing the possibility of recurrence of wheel slipping. The pressure restored in the brake cylinder associated with the slipping wheels will, however, ultimately attain a value substantially equal to that established in the control pipe 14.

If a slipping of the same wheel unit or units 11 again occurs during the same application of the brakes and before pressure switch 28 closes, the above operation is repeated and fluid under pressure is again rapidly released from the brake cylinder 12, and then restored at a restricted rate.

If wheel-slip re-occurs at a time subsequent to the blow-down of the pressure in the sanding reservoir sufficiently to close the pressure switch 28, a different operation occurs which will now be described. With the pressure switch 28 in closed position, the energization of the magnet winding 66 of the magnet valve 65 in response to the slipping of the wheels initially completes the circuit for energizing the magnet winding 110 of the magnet valves 110 and 107 and the magnet winding of the relay 29 as previously described. Upon the pick-up of the relay 29, however, a holding circuit is established independently of the magnet valve switch contacts 65 for maintaining the relay 29 picked up and the magnet winding 110 of the magnet valve 107 energized.

This circuit extends from the positive terminal of the battery 131 on the corresponding car by way of the wire 132 including the closed pressure switch 21, a branch wire 153 including the contacts 22 and 23 of the pressure switch 28 and the contact of the relay 29 to wire 139, then in parallel through the magnet winding 110 of the magnet valve 107 and the magnet winding of the relay 29 to the negative terminal of the battery 131 through the ground connection shown.

It will thus be apparent that upon the elapse of a predetermined time, which is illustratively shown as the blow-down time of the sanding reservoir 26, the restoration of the slipping wheels to a speed corresponding to vehicle speed and the consequent deenergization of the magnet winding 66 of the magnet valve 65 does not result in the deenergization of the magnet winding 110 of the magnet valve 107 because of the holding circuit therefor just described.

Accordingly, when fluid under pressure is resupplied to the relay valve mechanism 19 through the by-pass communication including the choke 63, the chamber 102 remains connected to atmosphere and fluid under pressure is resupplied only to the chamber 105. Thus, the reapplication of the brakes on the wheels which slipped following restoration thereof to vehicle speed will occur at a restricted or slow rate as in the previous instances but the ultimate value to which the pressure in the brake cylinder 12 is restored will be less than the pressure established in the control pipe 14. In the case of diaphragms 97 and 98 having an area ratio of ten to eight, as assumed, the ultimate pressure restored in the brake cylinder 12 will be eighty per cent of that remaining established in the control pipe 14. Thus, if the pressure in the control pipe 14 is forty pounds per square inch, the pressure ultimately restored in the brake cylinder 12 will be thirty-two pounds per square inch.

Due to the increase in the adhesion or rolling friction between the wheels and the rails caused by sanding of the rails, it is unlikely that wheel-slip will reoccur during the sanding period. If wheel-slip occurs after sanding has ceased, it is essential that the degree of application of the brakes restored on the slipping wheels be limited to a value which is less than that which initiated the slipping. It will thus be seen that by permitting the restoration of the pressure in the brake cylinders following wheel-slip to a value which corresponds to that established in the control pipe 14 at the time wheel-slip began, as long as sanding operation continues, a shorter stopping distance may be obtained than if the pressure restored in the brake cylinder were limited immediately following the first slipping of the wheels to a lower value than that established in the control pipe. Moreover, the limitation of the pressure restored in the brake cylinders to a value less than that which initiated the wheel-slipping only after the expiration of the sanding period prevents recurrence of slipping cycles after the expiration of the sanding period.

When a car or train comes to a stop following an application of the brakes during which the wheels slipped in the manner previously described, the brakes remain applied to a degree determined by the pressure in the brake cylinder 12 which may be equivalent to or a fraction of the pressure in the control pipe 14 depending upon whether magnet winding 110 of the magnet valve 107 remains energized or is deenergized.

To release the brakes before again starting the car, the operator merely restores the valve handle 17a to its brake release position as previously described. Ordinarily, the pressure in the chamber above the piston 37 will have blown-down sufficiently before it is again desired to start the car or train that the piston valve 43 will have been restored upwardly into seated relation on the rib seat 48, thus opening the ports 58 and 59. Thus, upon the restoration of the brake valve handle 17a to its brake release position, fluid under pressure will be released from one or both of the chambers 105 and 102 of the relay valve mechanism 19 at a rapid rate and the relay valve mechanism 19 will operate correspondingly to vent fluid under pressure from the brake cylinder 12 at a rapid rate.

When the pressure switch 21 opens in response to the reduction of the pressure in the control pipe 14 below five pounds per square inch, the holding circuit for maintaining the magnet winding 121 of the sanding magnet valve on the corresponding car is interrupted as well as the holding circuit for the relay 29 and the magnet valve 107 if it is established. Upon the deenergization of the magnet winding 121 of the sanding magnet valve 27, communication is restored through which the sanding reservoir 26 is recharged to the pressure in the supply pipe 15 and the pressure switch 28 is restored to its open position.

In adapting my invention to a train brake system, it will be apparent that the equipment described will be substantially duplicated for each wheel truck except that a single battery 131 and a single pressure switch 21 for each car is all that is required. If it is desired to provide only one battery 131 and pressure switch 21 for an entire train, then the wire 132 must be connected to an additional train wire, not shown in the drawing, to supply current from the single battery 131 to all cars of the train under control of the single pressure switch 21.

Accordingly, while I have shown only a simplified embodiment of my invention, various omissions, additions, or modifications in the equipment shown will be obvious to those skilled in the art for adapting the system to operation in a train brake system, without departing from the spirit of my invention. It is accordingly not my intention to limit the scope of my invention except in accordance with the terms of the appended claims.

Having now described my invention, what I claim as new and desire to secure by Letters Patent is:

1. Vehicle wheel brake control apparatus of the type in which the brakes associated with the wheels are applied and released under the control of the operator of the vehicle comprising, in combination, means responsive to the rotative deceleration of a wheel of the vehicle at a slipping rate caused by application of the brakes, means controlled by said wheel-slip-responsive means and operative when the said wheel slips for effecting a rapid release of the brakes associated with said wheel so that the wheel ceases to decelerate and accelerates back toward a speed corresponding to vehicle speed without locking and operative thereafter to cause reapplication of the brakes on the said wheel to either of two different degrees, and means for causing the last said means to effect reapplication of the brakes selectively to the one or the other of said two different degrees depending upon whether a certain uniform time has or has not elapsed following the instant the wheel first begins to slip during any one application of the brakes.

2. Vehicle wheel brake control apparatus of the type in which the brakes associated with the wheels are applied and released under the control of the operator of the vehicle comprising, in combination, means responsive to the rotative deceleration of a wheel of the vehicle at a slipping rate caused by application of the brakes, means controlled by said wheel-slip-responsive means and operative when the said wheel slips for effecting a rapid release of the brakes associated with said wheel so that the wheel ceases to decelerate and accelerates back toward a speed corresponding to vehicle speed without locking and operative thereafter to cause reapplication of the brakes on the said wheel, and means effective if the reapplication of the brakes effected by the last said means occurs within a certain uniform time following the instant the wheel first begins to slip during any one application for permitting the last said means to effect reapplication of the brakes on the wheel to a degree substantially corresponding to that in effect at the time the wheel begins to slip and operative to cause the last said means to effect reapplication of the brakes on the wheel to a degree less than that in effect at the time slipping of the wheel began if reapplication of the brakes occurs subsequent to the elapse of said certain uniform time.

3. In a vehicle wheel brake control apparatus of the type having means providing a communication chargeable with fluid at different pressures to correspondingly select the degree of application of the brakes, a brake cylinder for applying the brakes associated with a vehicle wheel in accordance with the pressure of fluid supplied thereto, and a relay valve mechanism controlled according to the pressure established in the communication for supplying fluid at a pressure which may bear selectively different ratios to the pressure established in the communication, the combination of means responsive to the rotative deceleration of the vehicle wheel at a slipping rate, means controlled by the wheel-slip-responsive means and effective when the wheel begins to slip for causing operation of the relay valve means to effect a reduction of the pressure in the brake cylinder and thereafter the resupply of fluid under pressure from the communication to the relay valve means to effect a resupply of fluid under pressure to the brake cylinder, and timing means set in operation at the instant the wheel first begins to slip during any one application for controlling the relay valve mechanism to cause it to restore a pressure in the brake cylinder which bears a certain one ratio to the pressure in the communication only if the relay valve means operates to resupply fluid under pressure to the brake cylinder at a time subsequent to the elapse of a certain uniform time following the instant the wheel first begins to slip during any one application.

4. In a vehicle wheel brake control apparatus of the type having a control pipe chargeable with fluid at different pressures to select the degree of application of the brakes, a brake cylinder effective to cause application of the brakes associated with a vehicle wheel in accordance with the pressure of fluid supplied thereto, and a differential relay valve mechanism including a magnet valve device, the relay valve mechanism being controlled in accordance with the pressure in the control pipe to effect the supply of fluid at a pressure substantially equivalent to that in the control pipe or a certain fixed fraction of the pressure in the control pipe depending upon whether the magnet valve device thereof is deenergized or energized respectively, the combination of means responsive to the rotative deceleration of the vehicle wheel at a slipping rate, valve means operatively controlled by the wheel-slip-responsive means and effective when the wheel slips for cutting off the supply of fluid under pressure from the control pipe to the relay valve mechanism and releasing fluid under pressure therefrom to effect a corresponding release of fluid under pressure from the brake cylinder, and timing means set in operation in response to the first operation of the wheel-slip-responsive means during any one application and effective when the wheel slips again after the elapse of a certain uniform time for effecting continued energization of the magnet valve of the relay valve mechanism, whereby to cause the relay valve mechanism to selectively restore pressure in the brake cylinder which is equal to the pressure in the control pipe or a certain fixed fraction thereof depending upon whether or not the certain uniform interval of time has not or has elapsed respectively.

5. In a vehicle wheel brake control apparatus of the type having a brake cylinder to which fluid under pressure is supplied to effect application of the brakes associated with a vehicle wheel and from which fluid under pressure is released to effect release of the brakes, the combination of a control pipe chargeable with fluid at different pressures, a relay valve mechanism variously conditionable to cause fluid at a pressure corresponding substantially to that established in the control pipe to be supplied to the brake cylinder or fluid at a pressure which is a certain fixed fraction of that in the control pipe depending upon the condition thereof, means effective upon the slipping of the vehicle wheel for effecting the release of fluid under pressure from the relay valve mechanism and the consequent release of fluid under pressure from the brake cylinder and thereafter effective to cause resupply of fluid under pressure to the relay valve mechanism and the consequent resupply of fluid under pressure to the brake cylinder, and timing means effective only after a certain uniform time following the instant the wheel first begins to slip during any one application for varying the condition of the relay valve mechanism to cause it to resupply fluid under pressure to the brake cylinder at a pressure which is the said certain fixed fraction of the pressure in the control pipe.

6. In a vehicle wheel brake control apparatus of the type having a brake cylinder to which fluid under pressure is supplied to effect application of the brakes associated with a vehicle wheel and from which fluid under pressure is released to effect release of the brakes, the combination of a control pipe chargeable with fluid at different pressures corresponding to the desired degree of application of the brakes, a relay valve mechanism controlled according to the pressure in the said control pipe, the relay valve mechanism having electroresponsive means and operative to supply fluid at a pressure substantially equal to that in the control pipe when the electroresponsive means is deenergized and at a pressure which is a certain fraction of that in the control pipe when the electroresponsive means is energized, means effective in response to the rotative deceleration of the vehicle wheel at a slipping rate for effecting the release of fluid under pressure from the relay valve mechanism and the consequent release of fluid under pressure from the brake cylinder and thereafter operative to cause the resupply of fluid under pressure to the relay valve mechanism and the consequent resupply of fluid under pressure to the brake cylinder, and timing means set in operation in response to the rotative deceleration of the vehicle wheel at a slipping rate and effective upon the elapse of a certain uniform time and whenever slipping of the wheel again occurs for effecting continued energization of the electroresponsive means of said relay valve mechanism, whereby when fluid under pressure is resupplied to the relay valve mechanism to effect the resupply of fluid under pressure to the brake cylinder, the fluid pressure restored in the brake cylinder is substantially equal to or a certain fraction of the pressure in the control pipe depending upon whether said certain uniform time has not or has elapsed respectively.

7. Vehicle wheel brake control apparatus comprising, in combination, a control pipe chargeable with fluid at different pressures in accordance with a desired degree of application of the brakes, relay valve mechanism variously conditionable and operative in response to the pressure established in said control pipe to cause fluid to be supplied to effect application of the brakes at a pressure having different ratios to the pressure in the control pipe depending upon the condition of the relay valve mechanism, a reservoir normally charged with fluid in excess of a certain pressure, pressure responsive means operatively responsive to the reduction of the pressure in said reservoir below said certain pressure, means operatively responsive to the deceleration of a vehicle wheel at a slipping rate, means controlled by the wheel-slip-responsive means and effective when a wheel slips for causing operation of the relay valve mechanism to release fluid under pressure for releasing the brakes and effective also to initiate a continued reduction of the pressure in said reservoir, said last means being further effective as the slipping wheel returns back toward a speed corresponding to vehicle speed for causing operation of the relay valve mechanism to resupply fluid under pressure to reapply the brakes and effective jointly with the said pressure responsive means only after the pressure of said reservoir reduces below said certain pressure for causing the relay valve means to be conditioned to resupply fluid under pressure at one certain one of said ratios with respect to the pressure in the control pipe.

8. Vehicle wheel brake control apparatus comprising, in combination, variously conditionable relay valve means operative when in one condition thereof in response to a given operating pressure to supply fluid at a certain pressure for effecting application of the brakes associated with the vehicle wheels and when in a different condition thereof to supply fluid at a lower pressure to effect application of the brakes in response to the given operating pressure, a reservoir normally charged with fluid under pressure, means operative upon the rotative deceleration of a vehicle wheel at a slipping rate for effecting operation of the relay valve means to release fluid under pressure to release the brakes and at the same time effective to initiate a continued reduction of the pressure in said reservoir, said last means being effective to cause operation of the relay valve means to resupply fluid under pressure to effect reapplication of the brakes as the slipping wheel returns back toward its speed corresponding to vehicle speed, and means effective when a wheel slips following the reduction of the pressure in said reservoir below a certain uniform pressure for conditioning the relay valve means to resupply fluid to effect application of the brakes at the said lower pressure.

9. In a vehicle wheel brake control apparatus of the type having a brake cylinder to which fluid under pressure is supplied to effect application of the brakes associated with one or more vehicle wheels and from which fluid under pressure is released to effect the release of said brakes, the combination of a relay valve mechanism variably conditionable and operative in response to an operating fluid pressure to supply fluid to the brake cylinder at a pressure having one certain fixed ratio to the operating pressure when in one condition and at a pressure having a certain fixed lower ratio to the operating pressure when in a different condition, means operatively responsive to the rotative deceleration of one of said wheels at a slipping rate, a reservoir normally charged with fluid under pressure, pressure responsive means controlled according to the pressure in said reservoir, and means controlled by the wheel-slip-responsive means and operative when a wheel slips to effect operation of the relay valve mechanism to release fluid under pressure from the brake cylinder and at the same time effective to initiate a continued reduction of the pressure in said reservoir, said last means being effective as the slipping wheel is restored back toward a speed corresponding to vehicle speed for causing the relay valve mechanism to resupply fluid under pressure to the brake cylinder and jointly effective with said pressure responsive means if said wheel slips again following the reduction of the pressure in the reservoir below a certain uniform pressure for conditioning the relay valve mechanism to resupply fluid under pressure to the brake cylinder at said certain fixed lower ratio to the operating pressure.

ELLIS E. HEWITT.